(12) United States Patent
Kerner et al.

(10) Patent No.: US 6,263,922 B1
(45) Date of Patent: Jul. 24, 2001

(54) CLAMPING HOLDER FOR FLEXIBLE LINES

(75) Inventors: Horst Kerner, Lindenberg; Stephan Arndt; Peter Schiller, both of Lindau, all of (DE)

(73) Assignee: Lindauer Dornier Gesselschaft mbH, Lindau (DE)

( * ) Notice: Subject to any disclaimer, the term of this patent is extended or adjusted under 35 U.S.C. 154(b) by 0 days.

(21) Appl. No.: 09/475,273

(22) Filed: Dec. 30, 1999

(30) Foreign Application Priority Data

Dec. 30, 1998 (DE) .............................. 198 60 741

(51) Int. Cl.⁷ .................. F16L 3/04; F16L 3/10; F16L 3/237; H02G 3/36
(52) U.S. Cl. .............. 139/1 R; 24/567; 24/523; 24/135 N; 174/168; 248/68.1
(58) Field of Search ............. 139/1 R; 174/168; 24/135 N, 567, 523; 248/68.1, 74.2

(56) References Cited

U.S. PATENT DOCUMENTS

| | | | |
|---|---|---|---|
| 25,695 | * 10/1859 | Warner | 24/567 |
| 760,922 | * 5/1904 | Rodman | 24/567 |
| 1,049,642 | * 1/1913 | Baesel | 24/567 |
| 2,113,852 | * 4/1938 | Meade | 24/567 |
| 2,796,228 | * 6/1957 | Kelly | 251/7 |
| 4,043,528 | * 8/1977 | Benoit et al. | 248/251 |
| 4,616,384 | * 10/1986 | Lowell et al. | 24/335 |
| 4,699,183 | * 10/1987 | Menzel | 139/449 |
| 5,271,588 | 12/1993 | Doyle . | |

FOREIGN PATENT DOCUMENTS

| | | |
|---|---|---|
| 692 152 | 6/1940 | (DE) . |
| 1 655 715 | 3/1953 | (DE) . |
| 18 44 454 | 11/1961 | (DE) . |
| 3 519 685 | 8/1985 | (DE) . |
| 884124 | 12/1961 | (GB) . |

* cited by examiner

*Primary Examiner*—Andy Falik
(74) *Attorney, Agent, or Firm*—Crowell & Moring, L.L.P.

(57) ABSTRACT

A clamping holder for flexible lines, particularly current-carrying lines, has a line holder with at least one device for fixing a line and a device clamping the line in the device. The device and the line holder have at least one mutually aligned passage, respectively. A known type of elastic, longitudinally extendible tension device is pulled into the passages. The tension device has a neck-type cross-sectional contraction and connects the line holder with the device in a ventable manner.

8 Claims, 2 Drawing Sheets

CLAMPING HOLDER FOR FLEXIBLE LINES

BACKGROUND OF THE INVENTION

This application claims priority of 198 60 741.5, filed in Germany on Dec. 30, 1998, the disclosure of which is expressly incorporated by reference herein.

The present invention relates to a clamping holder for flexible lines, particularly for current-carrying lines in mechanical weaving looms.

Clamping holders or clamps for flexible lines are generally known as seen in DE-PS 692 152 which relates to a line clamp with a clamp bottom part and a clamp top part. The line clamp is capable of clamping two parallel-extending lines. The clamping effect is achieved by a sleeve-type slotted extension existing on the clamp top part which engages in a recess of the clamp bottom part and can be fixedly clamped into the recess by way of a wedge-type nut which can be tightened by a screw. In addition to the manufacturing expenditures for the clamp top part, such a line clamp requires the devices (screw and wedge-type nut) which generate the clamping effect. The mounting and demounting of the line clamp also requires a comparatively large amount of time.

DE-GM 18 44 454 shows a clamp for holding rigid or bendable rod-shaped or tube-shaped parts on flat profiles or L-profiles. The clamping of the tube-shaped part also takes place by a screw acting upon a disk. This design has the same disadvantages as the line clamp of the above-mentioned configuration shown in DE-PS 692 152. In fact, the former has even more disadvantages because the clamp disk according to the DE-GM 18 44 454 is only capable of clamping a single tube-type part.

DE-GM 16 55 715 shows a wire clamp which consists of a base plate and a clamping saddle. For clamping several wires on the base plate, the clamping saddle is connected with the base plate under a moderate screw-down pressure. The object of this design does not do without the screwing-together of the clamping saddle and the base plate. This design therefore does not avoid a relatively time-consuming mounting of the clamping saddle.

In mechanical weaving looms, for example, it is required that, during an article change or for maintenance purposes, flexible lines are laid and, in the process, held such that they meet the special conditions on the mechanical weaving loom. During a change of the looming width (woven textile width), for example, the current-carrying lines of a movable weft stop guard must be caused to follow during its position change, and specifically such that the laying system of the lines is maintained. This following of the lines requires considerable expenditures for the detaching of the lines from their laying position and for the new fastening.

SUMMARY OF THE INVENTION

An object of the present invention is to provide a clamping holder for flexible lines which, without any time-consuming mounting work, permits a following of lines to movable modular units of a machine, particularly to modular units of a mechanical weaving loom.

According to the invention, this object has been achieved by providing that an elastic, longitudinally extendible tension device, which is known per se, is pulled into the passages, which has a neck-type cross-sectional contraction and connects the line holder with the device in a ventable manner.

It is therefore, provided according to the present invention to configure a clamping holder for flexible lines in a ventable manner in that a movably mountable or stationary line holder is equipped with at least one device fixing a line in the manner of a groove or crease pointing in the laying direction of the line. A device clamps the corresponding line therein by way of an elastic and longitudinally extendible tension device, which is known per se and which has a neck-type cross-sectional contraction, is connected with the line holder.

The connection of the clamping device with the line holder takes place in that the line holder and the clamping device has at least one mutually aligned passage each. In these passages the longitudinally extendible tension device is pulled such that the line holder and the at least one device clamping a line are mutually elastically braced.

It is advantageous that not only the connecting of the clamping device with the line holder takes place in a fast and simple manner such that the elastic tension device is pulled into the passage of the clamping device and into the passage of the line holder but the demounting is also extremely simple because it is sufficient to cut the tension device in the gap between the line holder and the clamping device by means of a knfe. The known tension device used in the present invention is described in 35 19 685 C1.

It is another advantage that required changes in the laying of the line can be made without tools, without high manual expenditures of force and without having to demount and remount the line holder with the clamping device. Thus, for changes of the laying of the line, the clamping device must only be pulled manually off the line holder against the tension force of the tension device in order to change the line in its position and to then discontinue the tension movement.

BRIEF DESCRIPTION OF THE DRAWINGS

Other objects, advantages and novel features of the present invention will become apparent from the following detailed description of the invention when considered in conjunction with the accompanying drawings.

DETAILED DESCRIPTION OF THE DRAWINGS

Figure 1:
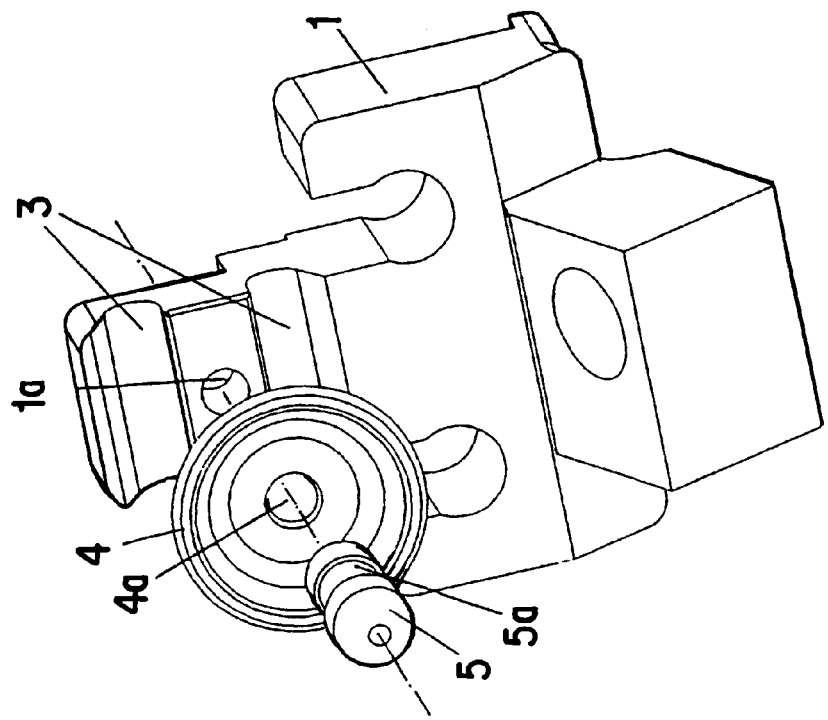
FIG. 1 is an exploded perspective view of the clamping holder.
Figure 2:
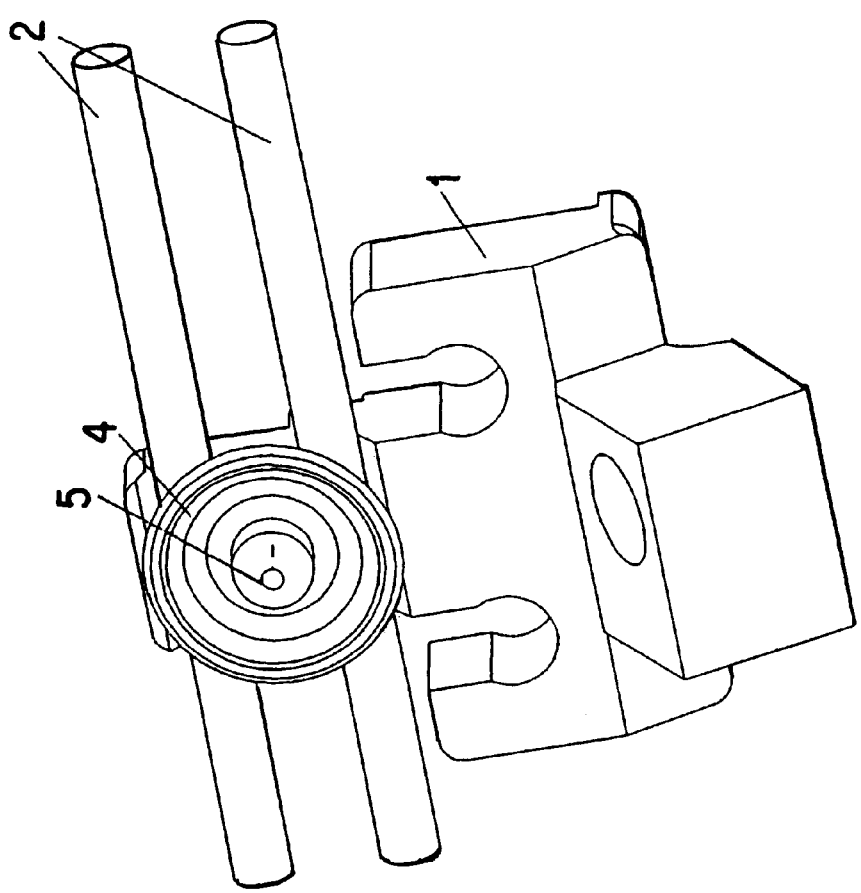
FIG. 2 is an unexploded perspective view of the clamping holder similar to FIG. 1 but with two clamped lines.

In FIGS. 1 and 2, the line holder 1, which may have any generally acceptable configuration, is simultaneously the holder of one or several staggered nozzles, as required in mechanical air nozzle weaving looms for the purpose of a weft yarn insertion into the weft yarn insertion duct of a weaving reed. It is to be understood, however, that the solution according to the present invention can be used not only on mechanical weaving looms, but wherever a clamped-screwed connection of lines can be used by means of clamping without any screwing together.

The line holder 1 has two receiving devices 3 which extend parallel to one another for the lines 2. A passage 1a in the form of a bore or the like is situated between the devices 3.

Figure 3:
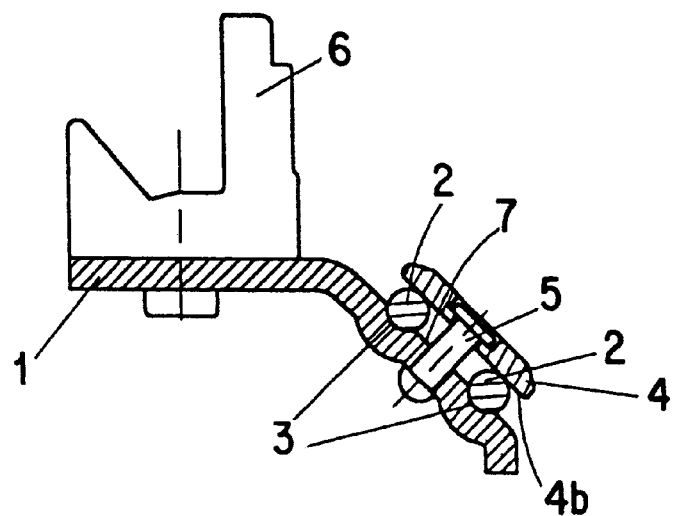
FIG. 3 is a partial cross-sectional view of an embodiment of the clamping holder which is simplified with respect to FIGS. 1 and 2.

A device 4, for example, an element constructed as a plate, has a centrically arranged passage 4a which can also be constructed as a bore or the like. The underside of the device 4, i.e., the side facing the devices 3, is constructed with a plane surface or, as illustrated in FIG. 3, is also provided with devices 3 like the ones of the line holder 1. The line holder 1 and the clamping device 4, by way of the corresponding passages 1a and 4a, are connected by way of the tension device 5 in the form of a unitary member described in U.S. Pat No. 4,699,183, as illustrated in FIGS. 2 to 4.

If a line 2 to be received in the receiving devices 3 is to be clamped in the line holder 1, the device 4 must only be lifted off the line holder 1 against the tension force of the tension device 5. The lines must then be inserted, or lines, already accommodated therein must be positioned according to the desired laying of the lines. Subsequently, the device 4 is clamped again with respect to the lines 2.

Figure 4:
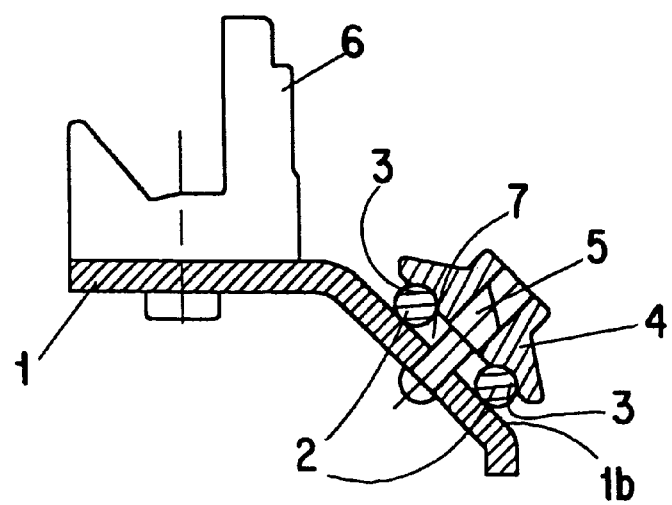
FIG. 4 is a view similar to FIG. 3 but of a second embodiment of the clamping device.

FIGS. 3 and 4 shows advantageously constructed line holders 1 which are not simultaneously constructed as staggered nozzle holders of a mechanical air nozzle weaving loom. The line holder is configured constructed here as an especially configured sheet metal part, which is connected with the so-called weaving reed strip 6 of a mechanical air nozzle weaving loom. The tension device 4 may have a configuration corresponding to the specific application conditions as illustrated in FIG. 4.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A clamping holder for flexible lines, including current-carrying lines, comprising a line holder having at least one device for fixing a line, a device for clamping the line in the at least one fixing device, the clamping device and the line holder having at least one mutually aligned passage respectively, and an elastic, longitudinally extendible tension device which is configured and arranged to be pulled into the passages and which has a neck-type cross-sectional contraction wherein the line holder is ventably connected with the device.

2. The clamping holder according to claim 1, wherein the at least one fixing device is a groove pointing in a laying direction of the line.

3. The clamping holder according to claim 1, wherein the clamping device is a plate like element.

4. The clamping holder according to claim 1, wherein the line holder is a staggered nozzle holder.

5. The clamping holder according to claim 1, wherein the line holder consists of at least one bent metal sheet adapted to be connected with a weaving reed strip, the at least one fixing device being a crease over the length of the metal sheet.

6. The clamping holder according to claim 1, wherein the clamping device has a flat clamping surface opposite the at least one fixing device.

7. The clamping holder according to claim 5, wherein the metal sheet has a plane clamping surface and the clamping device includes the at least one fixing device.

8. The clamping holder according to claim 1, wherein the tension device is a unitary member both connecting the line holder and the clamping device as well as providing an elastic basis for clamping the flexible lines between the line holder and the clamping device.

* * * * *